(12) United States Patent
Kaiser et al.

(10) Patent No.: US 8,579,067 B2
(45) Date of Patent: Nov. 12, 2013

(54) GAS SPRING AND ENGINE HOOD UNIT WITH THE GAS SPRING

(75) Inventors: Nadja Kaiser, Koblenz (DE); Axel Knopp, Eitelborn (DE); Gerhard Stein, Salz (DE); Jörg Wolf, Urmitz (DE)

(73) Assignee: Stabilus GmbH, Koblenz (DE)

( * ) Notice: Subject to any disclaimer, the term of this patent is extended or adjusted under 35 U.S.C. 154(b) by 63 days.

(21) Appl. No.: 13/116,417

(22) Filed: May 26, 2011

(65) Prior Publication Data

US 2011/0290575 A1 Dec. 1, 2011

(30) Foreign Application Priority Data

May 27, 2010 (DE) .......................... 10 2010 021 687

(51) Int. Cl.
*B60R 21/38* (2011.01)
(52) U.S. Cl.
USPC .. 180/274; 267/120; 296/187.04; 296/193.11
(58) Field of Classification Search
USPC ......... 180/274, 281; 267/64.11, 64.15, 64.26, 267/120, 124; 280/124.145–124.147, 280/124.154, 124.155, 124.157; 296/187.04, 193.11; 188/286, 297, 188/300, 313, 316, 322.12, 322.16, 322.17, 188/322.19, 322.22
See application file for complete search history.

(56) References Cited

U.S. PATENT DOCUMENTS

| | | | | |
|---|---|---|---|---|
| 2,595,426 A * | 5/1952 | Thornhill | 267/64.15 |
| 4,015,870 A * | 4/1977 | Stcherbatcheff et al. | 293/32 |
| 4,078,779 A * | 3/1978 | Molders | 267/120 |
| 4,298,194 A * | 11/1981 | Marx | 267/64.11 |
| 4,596,383 A * | 6/1986 | Howard | 267/64.12 |
| 4,779,845 A * | 10/1988 | Bartesch et al. | 267/120 |
| 4,788,747 A * | 12/1988 | Ludwig | 16/306 |
| 5,215,291 A * | 6/1993 | Bauer et al. | 267/120 |
| 5,615,867 A * | 4/1997 | Bauer | 267/64.11 |
| 6,092,632 A * | 7/2000 | Popjoy et al. | 188/277 |
| 6,213,454 B1* | 4/2001 | Bivens et al. | 267/64.12 |
| 6,415,883 B1* | 7/2002 | Myrholt et al. | 180/274 |
| 6,439,330 B1* | 8/2002 | Paye | 180/69.21 |
| 6,776,270 B2* | 8/2004 | Krog | 188/300 |
| 6,802,556 B2* | 10/2004 | Mattsson et al. | 296/187.09 |
| 7,232,178 B2* | 6/2007 | Neal et al. | 296/187.04 |
| 7,374,008 B1* | 5/2008 | Neal et al. | 180/274 |

(Continued)

FOREIGN PATENT DOCUMENTS

| | | | |
|---|---|---|---|
| DE | 10345719 A1 * | 4/2005 |
| GB | 2145190 A * | 3/1985 |
| GB | 2145191 A * | 3/1985 |

*Primary Examiner* — Faye M Fleming
*Assistant Examiner* — Laura Freedman
(74) *Attorney, Agent, or Firm* — Cozen O'Connor

(57) ABSTRACT

A gas spring with a center longitudinal axis including a cylinder includes a piston in the cylinder that divides the cylinder into a first cylinder chamber and a second cylinder chamber. A piston rod is arranged at the piston guided out of the cylinder at a second end opposite the first end. A connection element with a socket housing is arranged at each of the first end and the free end of the piston rod for receiving a ball head. At least one of the two socket housings comprises a ball socket with a longitudinal extension and a transverse dimension, the longitudinal extension is greater than the transverse dimension. A catch element having a spring tongue is arranged at the first end for insertion together with the catch element into a cover tube that locks into a recess associated with it in the cover tube.

12 Claims, 7 Drawing Sheets

(56) References Cited

U.S. PATENT DOCUMENTS

| | | | |
|---|---|---|---|
| 7,413,049 B2* | 8/2008 | Schramm et al. | 180/274 |
| 7,520,363 B2* | 4/2009 | Yamaguchi et al. | 180/274 |
| 7,997,375 B2* | 8/2011 | Shaw | 180/274 |
| 8,246,019 B2* | 8/2012 | Krajenke | 267/64.23 |
| 2007/0251779 A1* | 11/2007 | Bauman et al. | 188/322.12 |
| 2008/0012187 A1* | 1/2008 | Bauman et al. | 267/64.11 |
| 2009/0206531 A1* | 8/2009 | Probst | 267/64.26 |
| 2011/0290576 A1* | 12/2011 | Koestler et al. | 180/274 |

\* cited by examiner

GAS SPRING AND ENGINE HOOD UNIT WITH THE GAS SPRING

BACKGROUND OF THE INVENTION

Field of the Invention

The invention is directed to a gas spring with a center longitudinal axis, a first end, a cylinder filled with a fluid, a piston that is displaceably arranged in the cylinder and which divides the cylinder into a first cylinder chamber remote of the first end and a second cylinder chamber proximate to the first end, and a piston rod arranged at the piston that projects through the first cylinder chamber and is guided out of the cylinder concentric to the center longitudinal axis at a second end opposite the first end so as to be sealed by a guiding and sealing device.

The invention is further directed to an engine hood unit having an engine hood that is pivotably articulated at a vehicle body by at least one hinge device and which has at least one actuator that can be activated for raising the engine hood into a protective position when detecting a collision with a pedestrian.

SUMMARY OF THE INVENTION

An object of one embodiment of the invention is to provide a gas spring that provides a return stroke along a fixed distance when an additional force in excess of the extension force of the gas spring acts in the extension direction of the gas spring.

According to one embodiment of the invention a connection element with a socket housing is arranged at the first end and a connection element with a socket housing is arranged at the free end of the piston rod for receiving a ball head, at least one of the two socket housings comprising a ball socket that has a longitudinal extension and a transverse dimension, the longitudinal extension greater than the transverse dimension.

According to one embodiment of the invention, free ends of a spring clamp project through through-slots into the ball socket until the free ends contact the ball head to act upon this ball head in the ball socket, the width of the spring clamp along the center longitudinal axis being dimensioned so that the ball stud is arranged to be displaceable in the ball socket relative to the spring clamp along the center longitudinal axis.

Alternatively, the free ends of the spring clamp project through through-slots into the ball socket until the free ends contact the ball head so as to act upon this ball head in the ball socket, the width of the spring clamp along the center longitudinal axis being dimensioned so that the spring clamp is arranged to be displaceable together with the ball stud relative to the socket housing along the center longitudinal axis.

One object of the invention is that a catch element having at least one spring tongue is arranged at the first end, and the first end of the cylinder can be inserted together with the catch element into a cover tube until the at least one spring tongue locks into a recess associated with it in the cover tube, and the cylinder is arranged so as to be displaceable along the center longitudinal axis relative to the cover tube.

One object of the invention comprises providing an engine hood unit with improved collision protection for a pedestrian.

According to one embodiment of the invention a gas spring is arranged parallel to the actuator. The gas spring reinforces the opening of the engine hood in a first operating state.

Further, according to one embodiment of the invention, the gas spring damps the opening movement of the engine hood into the protective position in a second operating state corresponding to a detected collision with a pedestrian.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Embodiment examples of the invention are shown in the drawings and are described more fully in the following.

In the drawings.

DETAILED DESCRIPTION OF THE PRESENTLY PREFERRED EMBODIMENTS

Figure 1:
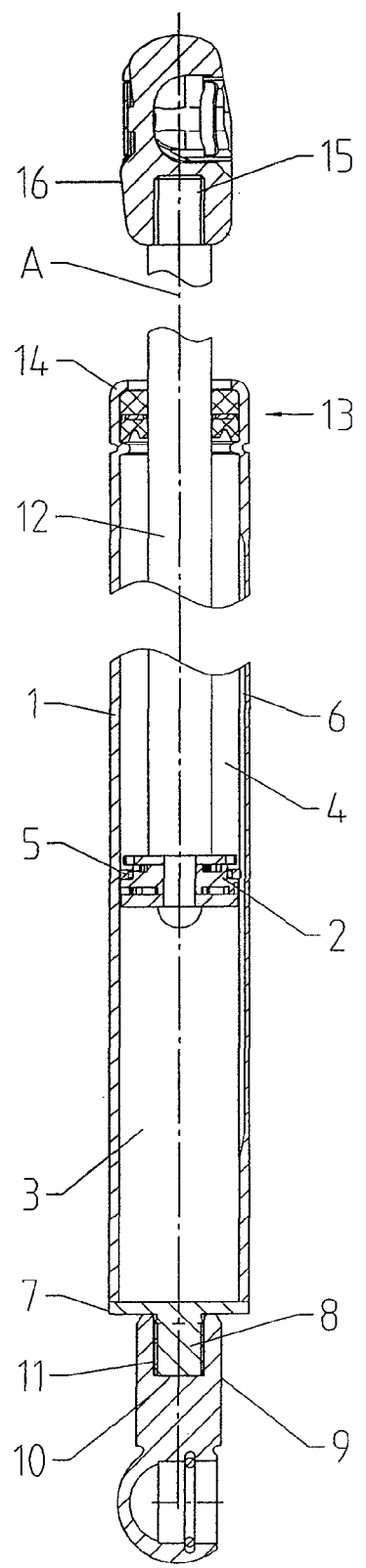
FIG. 1 is a sectional view through a piston-cylinder unit according to the invention.

The piston-cylinder unit shown in FIG. 1 is constructed as a gas spring with a cylinder 1, wherein a piston 2 is arranged so as to be axially displaceable, the gas-filled interior of the cylinder 1 which is under pressure is divided by this piston 2 into a first cylinder chamber 3 and a second cylinder chamber 4. The piston 2 can have overflow openings in the form of through-holes or, as is shown in this instance, a piston ring 5 under which flow can occur in at least one direction. Further, at least one axial groove 6 through which fluid can flow around the piston 2 can be formed in the cylinder 1.

On the side of the first cylinder chamber 3, the cylinder 1 has a closed first end 7 at which a threaded pin 8 is arranged concentric to the center longitudinal axis A of the cylinder 1. A connection element 9 is screwed onto the threaded pin 8 with a receiving chamber 11 formed in a fastening stud 10. A piston rod 12 is arranged at the piston 2. This piston rod 12 extends through the second cylinder chamber 4 concentric to the center longitudinal axis A and is guided out of the cylinder 1 via a sealing and guiding device 13 at a second end 14 opposite the first end 7. A threaded portion 15 on which another connection element 16 is screwed is formed at the free end of the piston rod 12 located outside the cylinder 1.

Figure 2A:
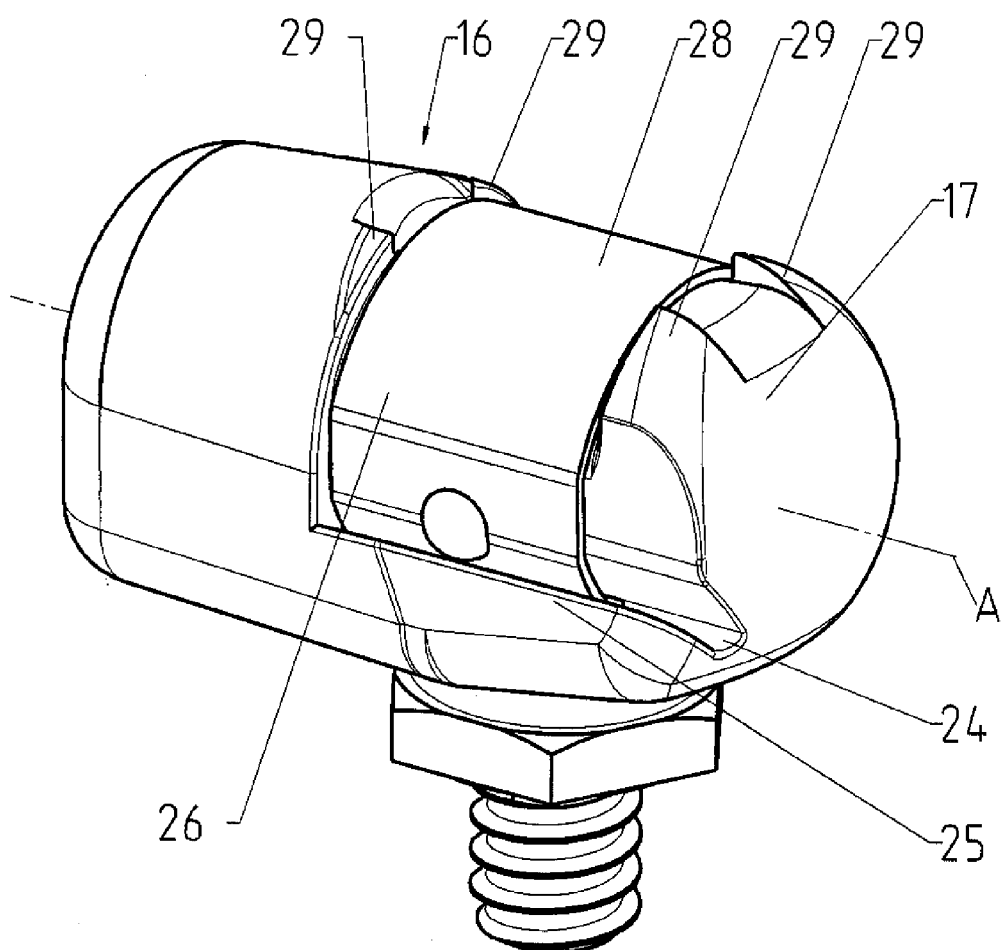
FIGS. 2a to 2c are a connection element of the piston-cylinder unit shown in FIG. 1.
Figure 2B:
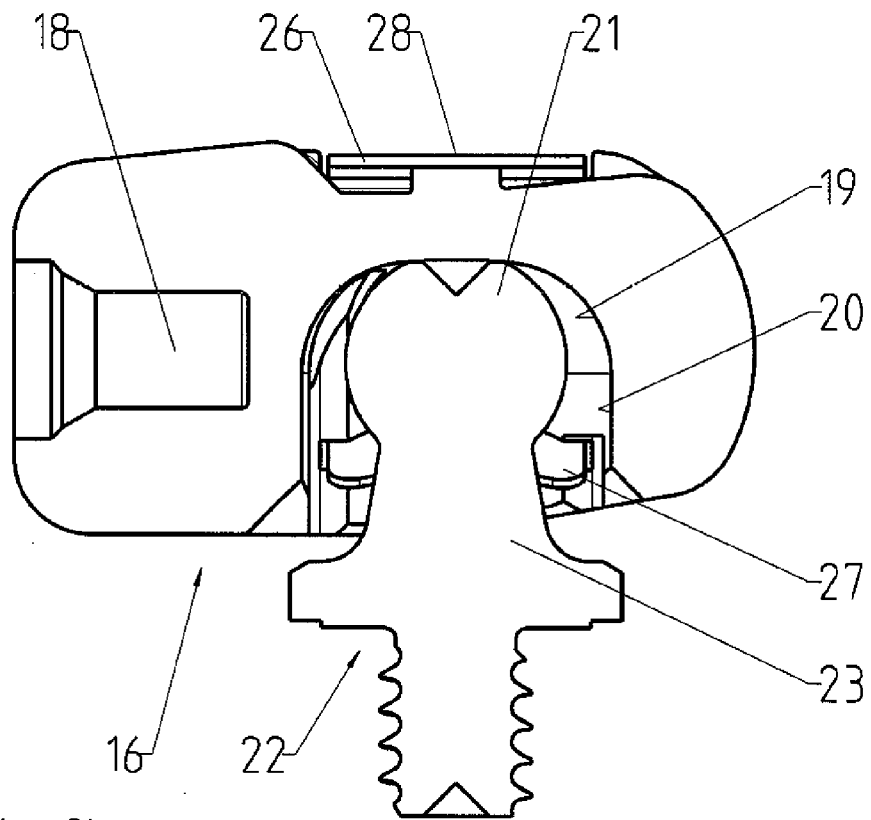
Figure 2C:
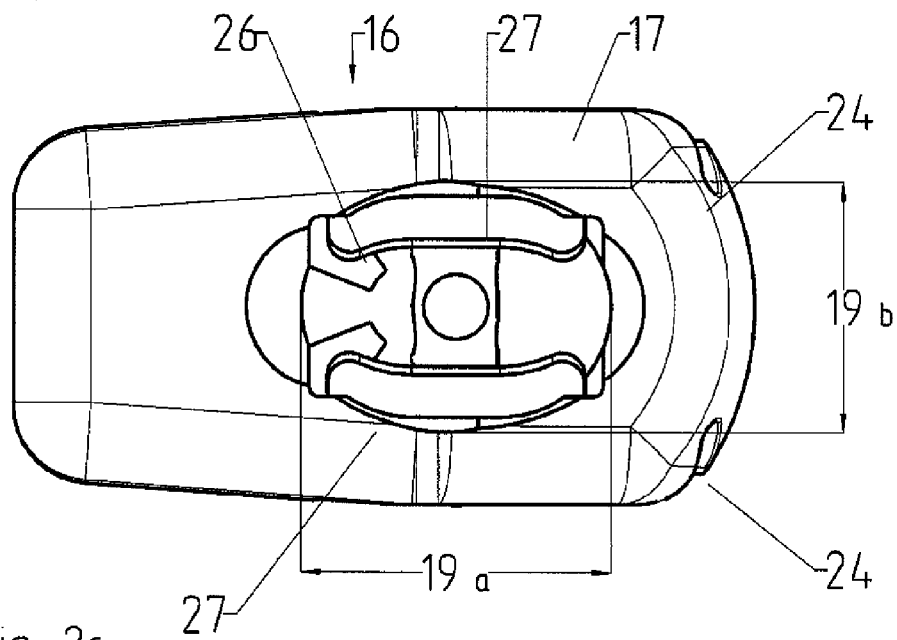

As is shown in more detail in FIGS. 2a, 2b and 2c, the connection element 16 has a socket housing 17. A receiving chamber 18 by which the connection element 16 is screwed to the threaded portion 15 is formed in the socket housing 17. A closed ball socket 19 with a longitudinal extension 19a and a transverse dimension 19b is formed in the socket housing 17, the longitudinal extension 19a being greater than the transverse dimension 19b. An insertion opening 20 leads outward from ball socket 19 transverse to the longitudinal extension of the receiving chamber 18. A ball head 21 of a ball stud 22 has a diameter corresponding to the transverse dimension 19b and is pivotably inserted into the ball socket 19 via the insertion opening 20, this ball stud 22 having a gudgeon 23 extending radially from the ball head 21 for fastening to a structural component part, e.g., a body part of a motor vehicle.

Two feed slots 24, whose ends open into through-slots 25 at mid-height with respect to the ball socket 19, extend symmetrically from the front side opposite the receiving chamber 18. The through-slots 25 are constructed so as to converge symmetrically with respect to one another and open out approximately in the transitional area between the ball socket 19 and the insertion opening 20.

A C-shaped spring clamp 26 comprising a spring clip and having a substantially rectangular cross section has converging free ends 27 corresponding to the converging through-slots 25. The cross section of the spring clip substantially corresponds to the cross section of the through-slots 25, and the thickness of the spring clip substantially corresponds to the width of the feed slots 24.

To assemble the spring clamp 26, the free ends 27 of this spring clamp 26 are inserted through the feed slots 24 from the front side of the socket housing 17 until the through-slots 25 and are then displaced inward through the through-slots 25 until the spring clamp 26 contacts the socket housing 17 so as to encircle it by the curved portion 28 connecting the free ends 27. The length of the free ends 27 is so dimensioned that the free ends 27 project into the insertion opening 20 and contact the ball head 21 so as to act upon the latter in the ball socket 18.

In this installation position of the spring clamp 26, the curved portion 28 of the spring clamp 26 is positioned between locking cams 29 which protrude at the outer surface of the socket housing 17 remote of the insertion opening 20 and which prevent a self-displacement of the spring clamp 26.

The ball head 21 is arranged in the ball socket 19 so as to be displaceable along the center longitudinal axis A. This is made possible in that, on the one hand, the ball socket 19 has a longitudinal extension 19a and a transverse dimension 19b, where the longitudinal extension 19a is greater than the transverse dimension 19b, and, on the other hand, the width of the spring clamp 26 along the center longitudinal axis A is so dimensioned that the ball stud 22 can also be displaced along the center longitudinal axis A at the same time.

Figure 3A:
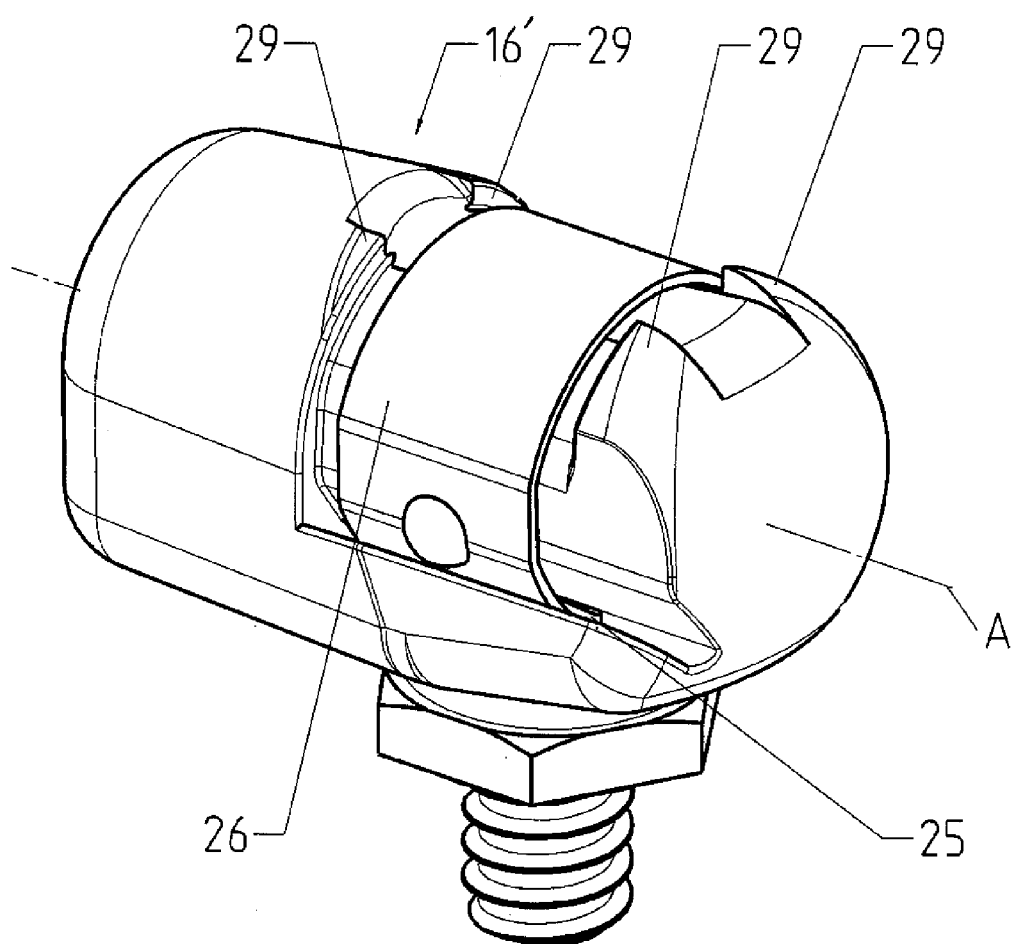
FIGS. 3a and 3b are another connection element of the piston-cylinder unit shown in FIG. 1.
Figure 3B:
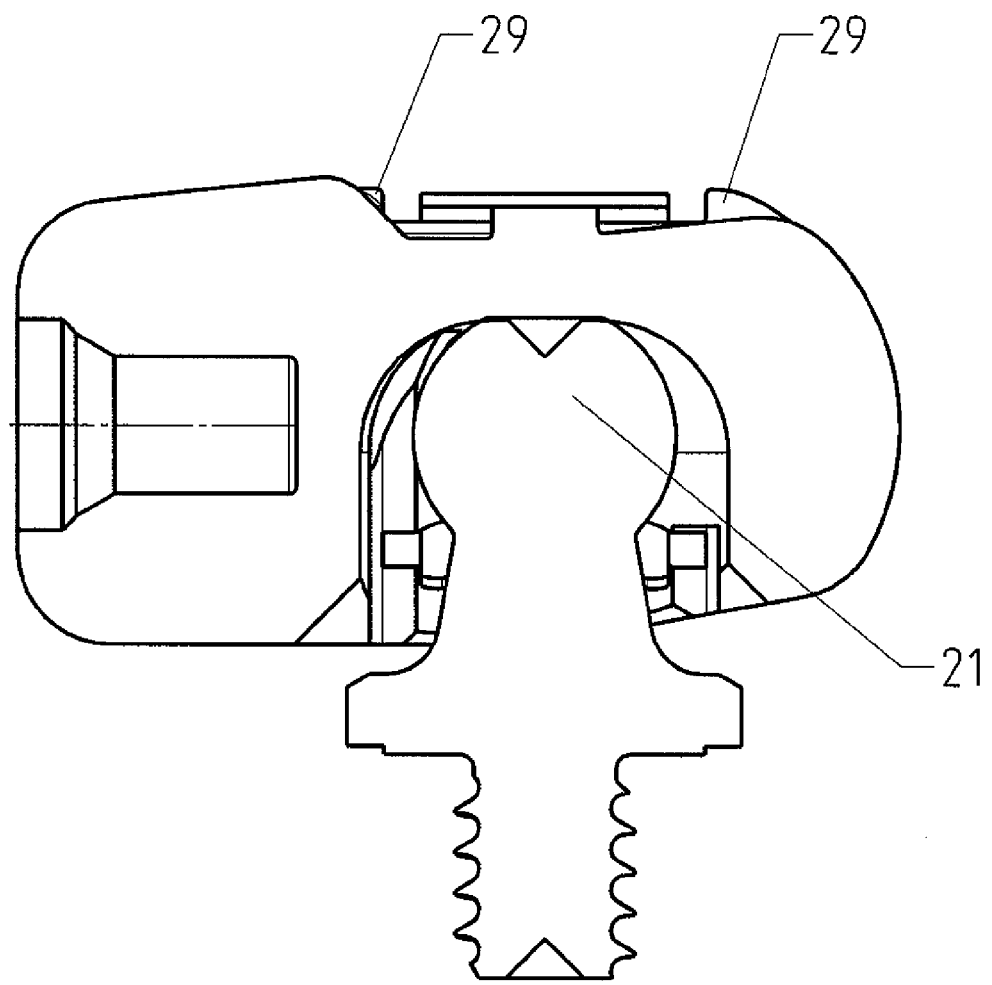

FIGS. 3a and 3b show another example of an embodiment of the connection element 16'. FIG. 3b shows a section through the connection element 16'. The spring clamp 26 has the usual width and is therefore displaceable along the center longitudinal axis A together with an inserted ball head 21 in the through-slots 25. The locking cams 29 in turn serve as stops for the spring clamp 26 to limit the axial movement of the spring clamp 26.

Figure 4A:
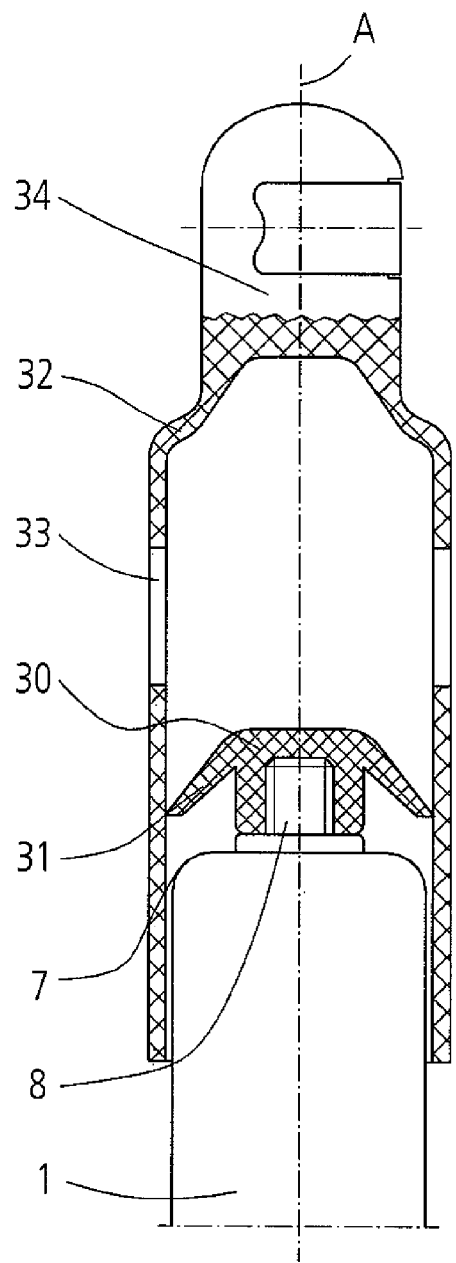
FIGS. 4a and 4b are another embodiment of the piston-cylinder unit according to the invention in longitudinal section.
Figure 4B:
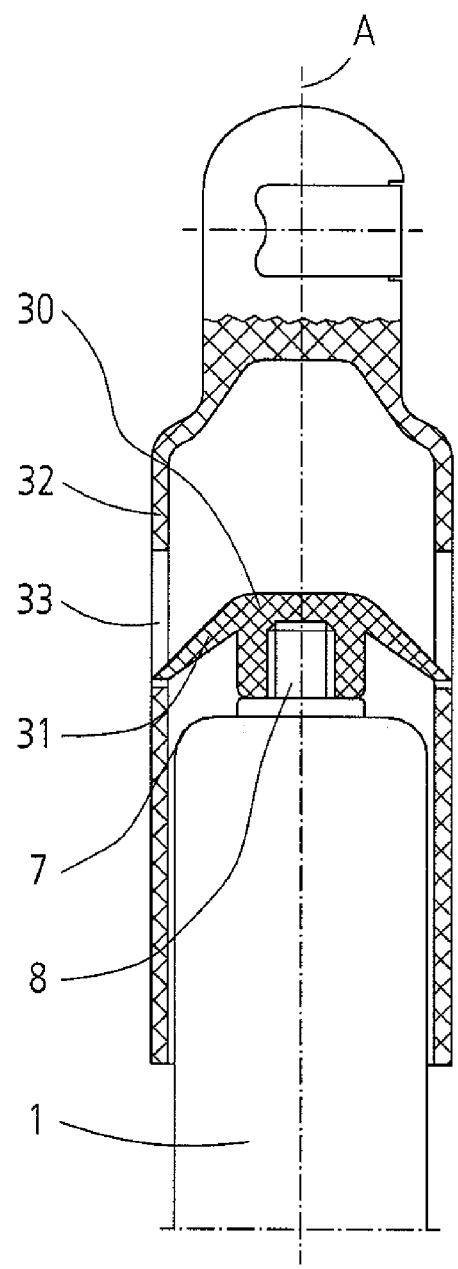

FIGS. 4a and 4b show another embodiment form of the piston cylinder unit according to the invention. A catch element 30 is arranged on the threaded pin 8 at the first end 7 of the cylinder 1. The catch element 30 has at least one flexible spring tongue 31 which is bent the first end 7 of the cylinder 1. Together with the catch element 30 screwed onto the threaded pin 8, the first end 7 of the cylinder 1 is pushed into a cover tube 32 until the at least one spring tongue 31 locks into a recess 33 associated with it in the cover tube 32.

In each instance, the at least one recess 33 is formed substantially as an axial groove or elongated hole so that the cylinder 1 of the gas spring is movable along the center longitudinal axis A. A conventional connection element 34, for example, a ball socket or a knuckle eye, is arranged at the end of the cover tube 32 for fastening to a structural component part, e.g., a body part of a motor vehicle.

Figure 5:
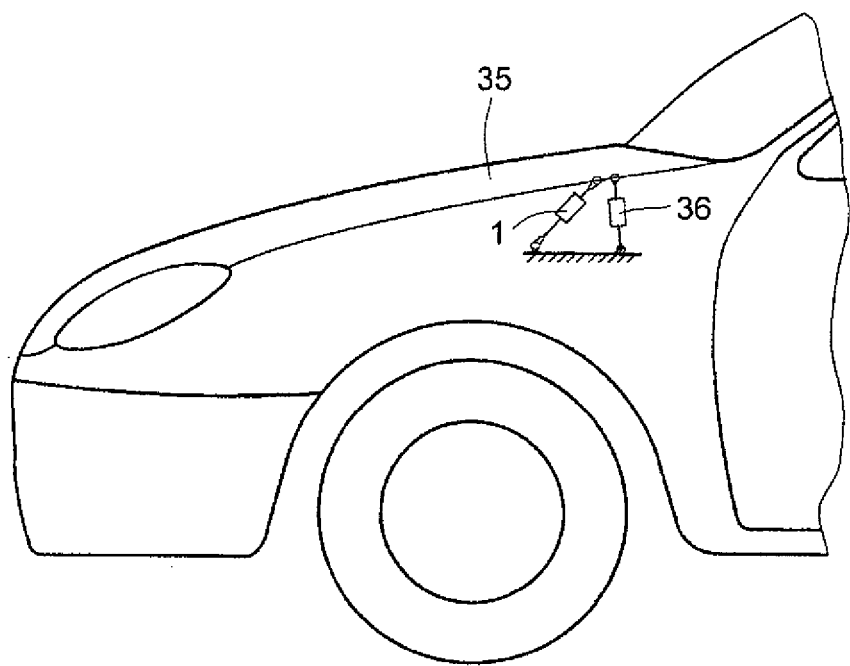
FIG 5 shows the use of a piston-cylinder unit in accordance with embodiments of the invention, coupled to an engine hood in a motor vehicle, in accordance with another embodiment of the invention.

When the embodiment forms described above are used in a motor vehicle, as is shown in FIG. 5, the gas spring with its cylinder 1 under pressure in a first operating state assists in opening the engine hood 35, for example, to perform maintenance work in the engine compartment. In a second operating state, for example, in detecting a collision with a pedestrian, in which the engine hood 35 is moved very quickly into a protective position by an actuator 36, for example, by a pyrotechnic actuator, the gas spring serves to damp the opening movement of the engine hood 35 into the protective position so as to prevent the engine hood 35 from over-swinging, since otherwise it is possible that the collision with the pedestrian can take place when the engine hood is insufficiently raised.

To prevent premature damping of the opening movement into the protective position, the gas spring can carry out a return stroke until the damping can finally be carried out by the gas spring.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A gas spring with a center longitudinal axis, comprising:
   a cylinder filled with a fluid having a first end and a second end opposite the first end;
   a piston displaceably arranged in the cylinder, the piston dividing the cylinder into a first cylinder chamber remote of the first end and a second cylinder chamber proximate to the first end;
   a piston rod coupled to the piston, the piston rod projecting through the first cylinder chamber;
   a guiding and sealing device guiding the piston rod out of the second end of the cylinder concentric to the center longitudinal axis, the piston rod being sealed by the guiding and sealing device;
   a first connection element with a first socket housing at the first end of the cylinder; and
   a second connection element with a second socket housing at a free end of the piston rod for receiving a ball head, wherein at least one of the first and the second socket housings comprises a ball socket having a longitudinal extension and a transverse dimension, the longitudinal extension being greater than the transverse dimension.

2. The gas spring according to claim 1, further comprising a spring clamp having free ends projecting through through-slots into the ball socket until the free ends of the spring clamp contact the ball head to act upon the ball head in the ball socket, wherein a width of the spring clamp along the center longitudinal axis is dimensioned so that a ball stud is displaceably arranged in the ball socket relative to the spring clamp along the center longitudinal axis.

3. The gas spring according to claim 1, wherein the second socket housing comprises a first ball socket, the gas spring further comprising a spring clamp having free ends projecting through through-slots into the first ball socket until the free ends of the spring clamp contact the ball head to act upon the ball head in the first ball socket, wherein a width of the spring clamp along the center longitudinal axis is dimensioned so that the spring clamp is displaceably arranged together with a ball stud relative to the second socket housing along the center longitudinal axis.

4. A gas spring with a center longitudinal axis, comprising:
   a cylinder filled with a fluid having a first end and a second end opposite the first end;
   a piston displaceably arranged in the cylinder, the piston dividing the cylinder into a first cylinder chamber remote of the first end and a second cylinder chamber in proximity to the first end;
   a piston rod coupled to the piston, the piston rod projecting through the first cylinder chamber;
   a guiding and sealing device guiding the piston rod out of the second end of the cylinder concentric to the center longitudinal axis, the piston rod being sealed by the guiding and sealing device; and
   a catch element having at least one spring tongue at the first end,
   wherein the first end of the cylinder is configured to be inserted together with the catch element into a cover tube until the at least one spring tongue locks into a recess defined by the cover tube, and the cylinder is arranged to be displaceable along the center longitudinal axis relative to the cover tube.

5. An engine hood unit comprising:
   an engine hood pivotably articulated at a vehicle body by at least one hinge device;
   at least one actuator for raising the engine hood into a protective position when detecting a collision with a pedestrian; and
   a gas spring with a center longitudinal axis arranged parallel to the actuator, the gas spring comprising:
   a cylinder filled with a fluid having a first end and a second end opposite the first end;
   a piston displaceably arranged in the cylinder, the piston dividing the cylinder into a first cylinder chamber remote of the first end and a second cylinder chamber proximate to the first end; and
   a piston rod coupled to the piston, the piston rod projecting through the first cylinder chamber;
   a guiding and sealing device guiding the piston rod out of the second end of the cylinder concentric to the center longitudinal axis, the piston rod being sealed by the guiding and sealing device;
   a first connection element with a first socket housing at the first end;
   a second connection element with a second socket housing at a free end of the piston rod for receiving a ball head,
   wherein at least one of the first and the second socket housings comprises a ball socket having a longitudinal extension and a transverse dimension, the longitudinal extension being greater than the transverse dimension.

6. An engine hood unit according to claim 5, wherein the gas spring is configured to reinforce opening movement of the engine hood in a first operating state.

7. An engine hood unit according to claim 5, wherein the gas spring is configured to damp opening movement of the engine hood into the protective position in a second operating state corresponding to a detected collision with a pedestrian.

8. The engine hood unit according to claim 5, further comprising a spring clamp having free ends projecting through through-slots into the ball socket until the free ends of the spring clamp contact the ball head to act upon the ball head in the ball socket, wherein a width of the spring clamp along the center longitudinal axis is dimensioned so that a ball stud is displaceably arranged in the ball socket relative to the spring clamp along the center longitudinal axis.

9. The engine hood unit according to claim 5, wherein the second socket housing comprises a first ball socket, the gas spring further comprising a spring clamp having free ends projecting through through-slots into the first ball socket until the free ends of the spring clamp contact the ball head to act upon the ball head in the first ball socket, wherein a width of the spring clamp along the center longitudinal axis is dimensioned so that the spring clamp is displaceably arranged together with a ball stud relative to the second socket housing along the center longitudinal axis.

10. An engine hood unit comprising:
    an engine hood pivotably articulated at a vehicle body by at least one hinge device;
    at least one actuator for raising the engine hood into a protective position when detecting a collision with a pedestrian; and
    a gas spring with a center longitudinal axis arranged parallel to the actuator, the gas spring comprising:
    a cylinder filled with a fluid having a first end and a second end opposite the first end;
    a piston displaceably arranged in the cylinder to divide the cylinder into a first cylinder chamber remote of the first end and a second cylinder chamber in proximity to the first end;
    a piston rod projecting through the first cylinder chamber;
    a guiding and sealing device guiding the piston rod out of the second end of the cylinder concentric to the center longitudinal axis, the piston rod being sealed at the second end by the guiding and sealing device; and
    a catch element having at least one spring tongue arranged at the first end,
    wherein the first end of the cylinder is configured to be inserted together with the catch element into a cover tube until the at least one spring tongue locks into a recess defined by the cover tube, and the cylinder is displaceable along the center longitudinal axis relative to the cover tube.

11. An engine hood unit according to claim 10, wherein the gas spring is configured to reinforce opening movement of the engine hood in a first operating state.

12. An engine hood unit according to claim 10, wherein the gas spring is configured to damp opening movement of the engine hood into the protective position in a second operating state corresponding to a detected collision with a pedestrian.

* * * * *